United States Patent [19]

Judex

[11] Patent Number: 5,211,968
[45] Date of Patent: May 18, 1993

[54] DOUGH DIVIDING MACHINE

[75] Inventor: Helmut Judex, Schwieberdingen, Fed. Rep. of Germany

[73] Assignee: Werner & Pfleiderer GmbH, Stuttgart, Fed. Rep. of Germany

[21] Appl. No.: 809,763

[22] Filed: Dec. 18, 1991

[30] Foreign Application Priority Data

Jan. 7, 1991 [DE] Fed. Rep. of Germany ....... 4100243

[51] Int. Cl.$^5$ .............................................. A21C 5/02
[52] U.S. Cl. ...................... 425/238; 222/283; 222/288; 222/306; 222/368; 425/240; 425/241
[58] Field of Search ............ 91/508; 92/22, 23, 51; 222/153, 217, 218, 221, 266, 283, 288, 292, 293, 303, 304, 305, 306, 307, 363, 368; 425/238, 239, 240, 241; 426/503

[56] References Cited

U.S. PATENT DOCUMENTS

| 802,613 | 10/1905 | Van Houten | 425/240 |
| 1,171,330 | 2/1916 | Embrey | 425/240 |
| 1,742,774 | 1/1930 | Mairich | 425/241 |
| 1,760,407 | 5/1930 | Hebebrand | 222/292 |
| 3,408,962 | 11/1968 | Nishimura | 425/240 |
| 4,391,576 | 7/1983 | Cummins | 425/241 |
| 4,503,995 | 3/1985 | Anderson | 425/241 |
| 4,778,079 | 10/1988 | Judex | 222/153 |

FOREIGN PATENT DOCUMENTS

| 183138 | 5/1907 | Fed. Rep. of Germany | 425/238 |
| 1240781 | 5/1967 | Fed. Rep. of Germany | 425/238 |
| 3436258 | 4/1986 | Fed. Rep. of Germany | 425/241 |
| 350449 | 10/1972 | U.S.S.R. | 425/241 |
| 383071 | 11/1932 | United Kingdom | 425/239 |

*Primary Examiner*—Scott Bushey
*Attorney, Agent, or Firm*—Ladas & Parry

[57] ABSTRACT

A machine for dividing dough in which a dough supply unit delivers dough under pressure at an outlet end into dividing chambers of a rotatable carrier, the carrier having double measurement pistons in the dividing chambers for selectively delivering larger and smaller dough masses for a given stroke of the pistons. Each of the measurement pistons can be manually adjusted from outside the machine to be placed into first and second operational states in which, for a given stroke of the measurement piston respective larger and smaller volumes of dough mass are discharged from the machine. Each measurement piston includes an external piston slidable in a respective dividing chamber and an internal piston slidable in the external piston and the pistons are coupled for conjoint movement in the first operational state whereas in the second operational state, the external piston is fixed in the dividing chamber and the internal piston is slidable in the external piston. The measurement piston is changed between the first and second operational states by selectively locking the external piston in the dividing chamber and selectively locking the external and internal pistons for conjoint movement.

15 Claims, 5 Drawing Sheets

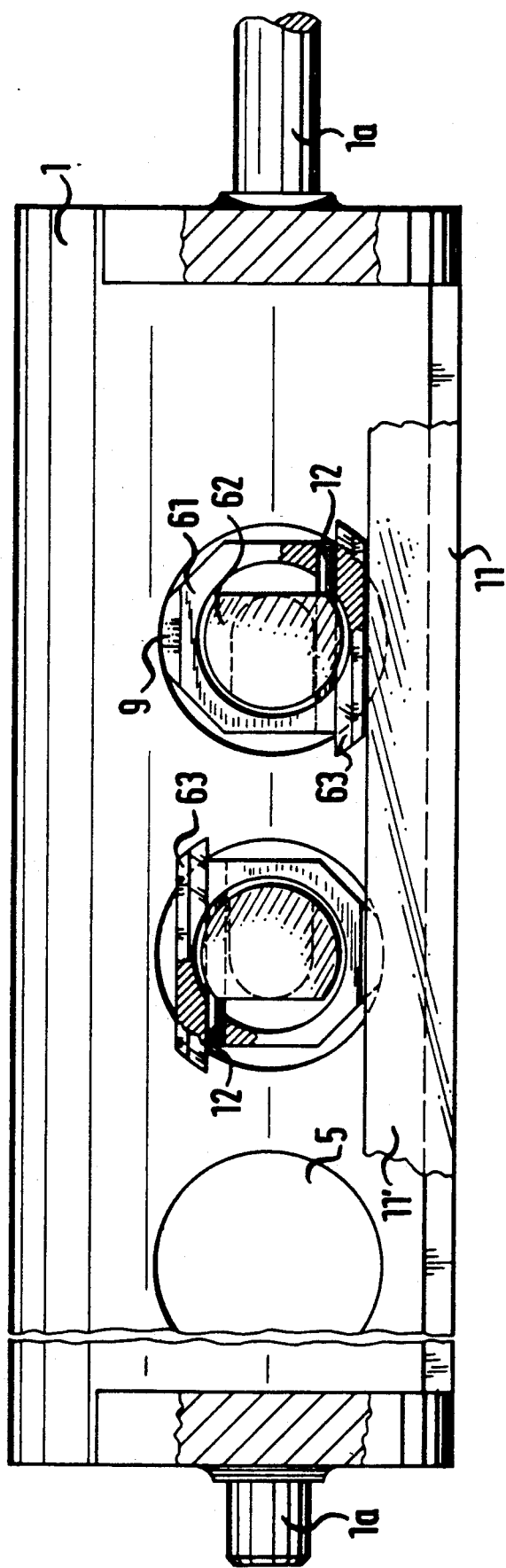

DOUGH DIVIDING MACHINE

FIELD OF THE INVENTION

The invention relates to a dough dividing machine and particularly to a dough dividing machine which is capable of selectively delivering different volumes of dough mass.

BACKGROUND AND PRIOR ART

In dough dividing machines having one carrier with a plurality of dividing chambers arranged next to each other in a row, the dough can only be divided into pieces of a specific range of volume which is a function of the stroke of measurement pistons in the dividing chambers. For a given stroke of the measurement pistons, dough pieces of the same mass or volume will be obtained from the machine.

If dough pieces of different sizes exceeding the range obtainable by varying the stroke of the pistons are desired, either a second machine is necessary, or the carrier for the dividing chambers inclusive of the measurement pistons must be replaced.

A machine for dividing dough pieces into large and small sizes is disclosed in DE 34 36 258 A1 and comprises a cylindrical carrier having at least two rows of dividing chambers arranged at an angular displacement of 90°, the dividing chambers in the two rows having different cross-sections, the dividing chambers in each row having the same cross-section. Correspondingly adapted measurement pistons are associated with the different-size dividing chambers, so that by a simple rotation of the carrier by 90°, a different dough volume can be divided. Such a carrier is relatively expensive since it must have at least two rows of dividing chambers with their respective measurement pistons and associated drive means, even though only one row of measuring chambers is used at any one time. Another disadvantage is that only dough volumes of the same size can be divided in each row.

A machine is disclosed in DE 35 30 724CL wherein one row of dividing chambers is provided in a carrier and the piston is each chamber is capable of being deactivated so that no dough is delivered from the respective chamber.

SUMMARY OF THE INVENTION

An object of the invention is to provide a dough dividing machine capable of selectively producing, for a given stroke of the pistons, dough pieces of different volume from the chambers in a single row of a carrier.

A further object of the invention is to provide such a dough dividing machine in which the dough pieces of different volume can be produced without replacement of any of the parts of the machine.

A further object of the invention is to provide a dough dividing machine of simple construction which avoids the need for replacement of the carrier when a different dough size is to be produced and additionally avoids the need for extra equipment, such as measurement pistons in a second row of dividing chambers.

Yet another object of the invention is to provide a dough dividing machine having a row of dividing chambers in a carrier including respective piston means in each chamber by which different volumes of dough can be divided in the chambers or the chambers can be selectively rendered inoperative so that within the same row, different or no dough masses can be discharged from the machine.

In order to satisfy the above and further objects of the invention, there is provided a dough dividing machine having a carrier with a single row of dividing chambers each of which includes a piston means having first and second operational states for dividing different size dough pieces in the dividing chamber.

In further accordance with the invention, the first and second operational states of the piston means is selected from outside the piston means by a simple rotational movement of the piston means.

The invention also provides for division of different size dough pieces even though the stroke of the piston means is substantially constant whereby the drive means for the piston means is unaffected by change in size of the produced dough pieces.

The invention comprises forming the piston means as external and internal pistons in an arrangement in which in one operational state the pistons undergo conjoint operation to produce larger dough pieces, whereas in the second operational state, the external piston is locked in the carrier and the smaller internal piston is displaced within the external piston to produce smaller dough pieces. The displacement of the internal piston within the external piston can be guided by a suitable guide means between the pistons and in one embodiment a longitudinal groove is provided in one piston and a projection means is provided on the other piston engaged in said groove.

According to the invention, the change of operational state of the piston means is effected externally of the piston means by relatively rotating the pistons by 180° between a locked position of the pistons and an unlocked position of the pistons, the external piston in the unlocked position being coupled to the carrier and prevented from undergoing displacement in a discharge stroke in the dividing chamber.

In a particular embodiment, the internal piston is supported for slidable movement in the external piston by slidably supporting an eccentric shaft on the internal piston is an end wall of the external piston.

In further accordance with the invention, the drive means for driving the piston means in its displacement stroke for discharge of the dough pieces comprises an ejection means having an ejecting rod carrying rollers acting on the internal pistons to drive the same, either alone or coupled to the external pistons so that the coupled pistons are driven together.

BRIEF DESCRIPTION OF THE FIGURES OF THE DRAWING

FIG. 7 is an end view of the carrier viewed from the right in FIG. 1.

DETAILED DESCRIPTION OF PREFERRED EMBODIMENTS

Figure 1:
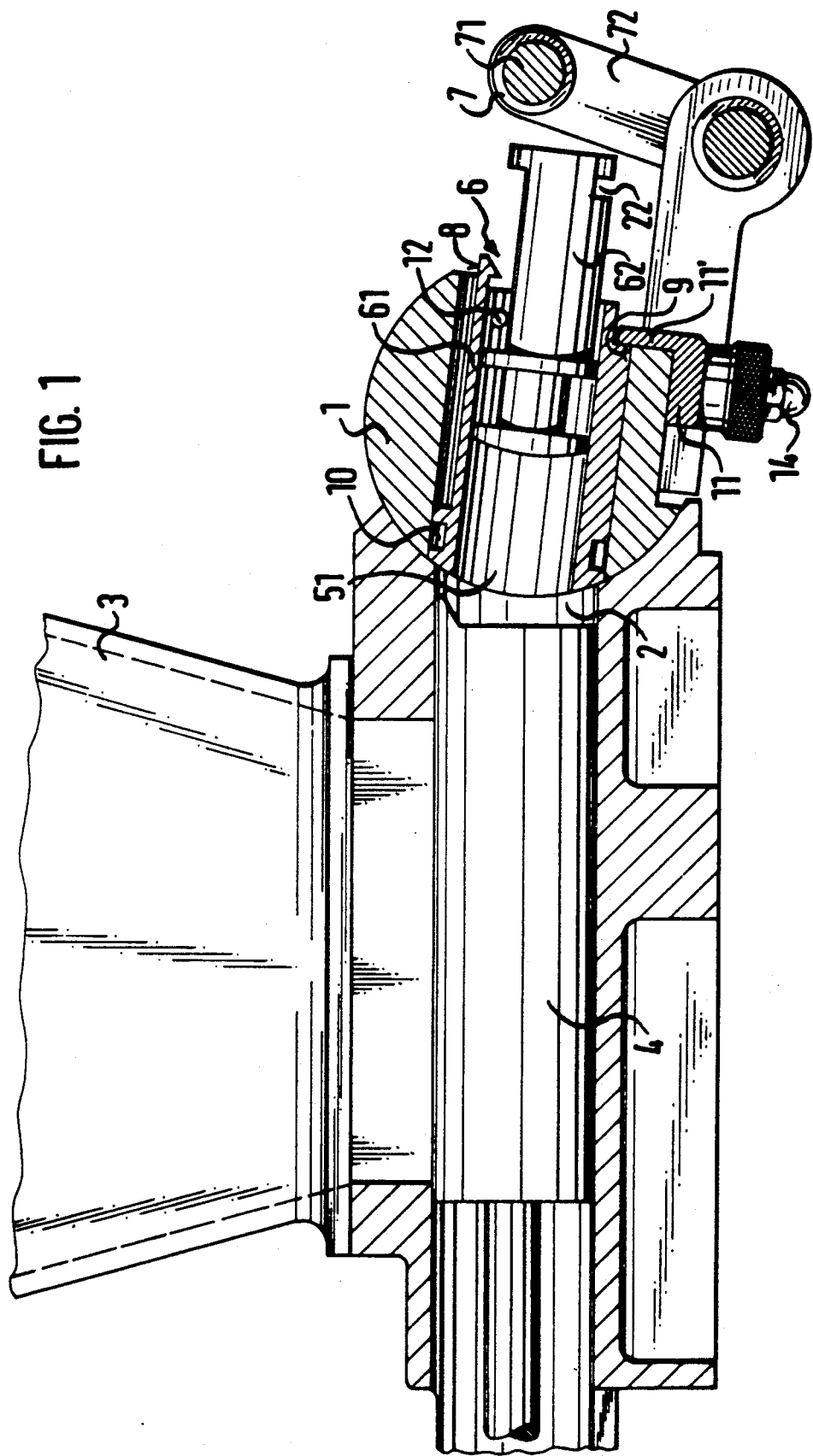
FIG. 1 is a vertical sectional view through a first embodiment of a dough dividing machine, according to the invention, in a first operational state.
Figure 2:
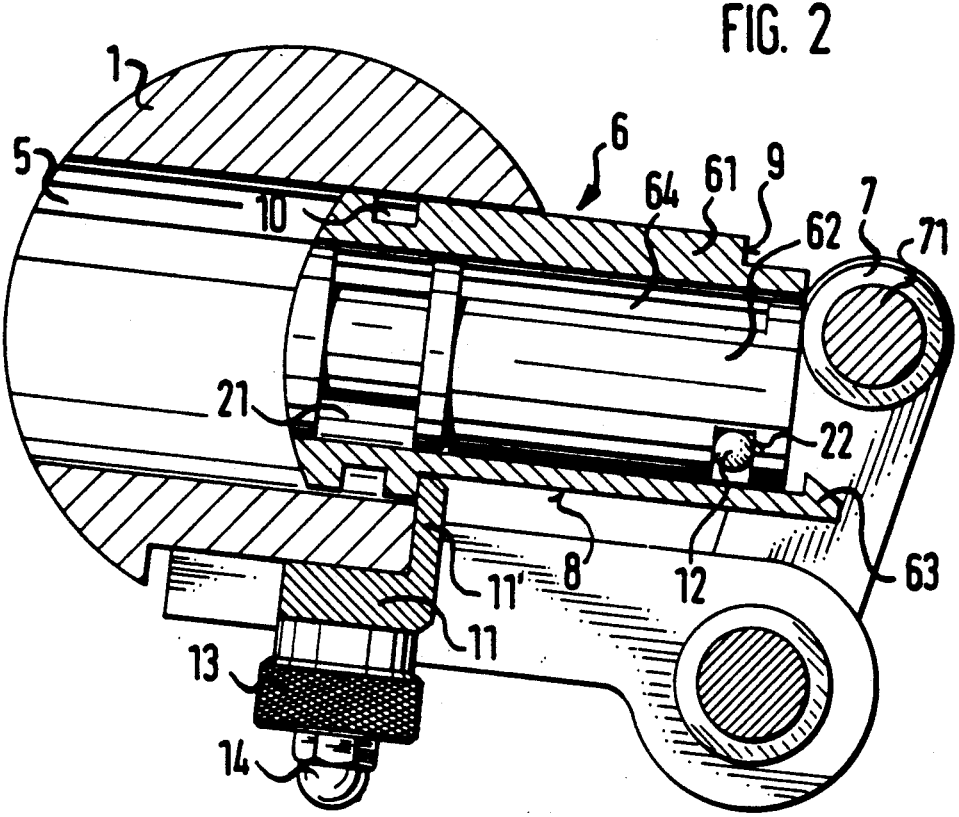
FIG. 2 shows, on enlarged scale, a portion of the machine in FIG. 1 in which a piston means is retracted in a carrier in a second operational state.

The dough dividing machine shown in FIG. 1 has a dividing chamber carrier 1 rotatably supported at an outlet 2 of a dough supply unit. The dough supply unit comprises a dough hopper 3 and a dough delivery piston 4, which moves forward and backward in a chamber disposed beneath hopper 3. The dough is aspirated from dough hopper 3 upon retraction of dough delivery piston 4 in a rearward stroke, and when the piston 4 is reversed in a forward stroke, the dough is injected either into dividing chambers 5 formed directly in carrier 1 as shown in FIG. 2 or into smaller dividing chambers 51 formed in displaceable piston means 6 in carrier 1 as shown in FIG. 1. The selection of which chambers the dough is delivered into will be explained more fully later. As seen in FIG. 7, the dividing chambers 5 are arranged in a row next to each other in carrier 1.

Each of the dividing chambers includes a respective piston means 6 in the form of a double measurement piston comprising an external primary piston 61 (analogous to the piston in DE 35 30 724) which can be selectively locked in the dividing chamber carrier 1 by means of a stop 11, and an internal smaller piston 62 which can be selectively coupled with the external piston 61 for common axial displacement therewith or released for separate axial displacement within the external piston 61. As will be seen later, this provides two operational states in which different size pieces of dough can be discharged from the dough dividing machine. Rollers 7, mounted on an ejector rod 71 attached to the dividing chamber carrier 1 by means of two pivotal levers 72, act on the back ends of the small measurement pistons 62 to effect displacement of the piston means 6 in the carrier 1.

After the delivery piston 4 has delivered a quantity of dough into the dividing chambers 5 or 51 to fill these chambers, the selection of the dividing chambers is a function of the operational state of the piston means 6 as will be explained later), the carrier 1 is rotated 90° counterclockwise in FIG. 1 to a discharge position (shown in FIG. 6) in which the dividing chambers face downwardly.

Figure 6:
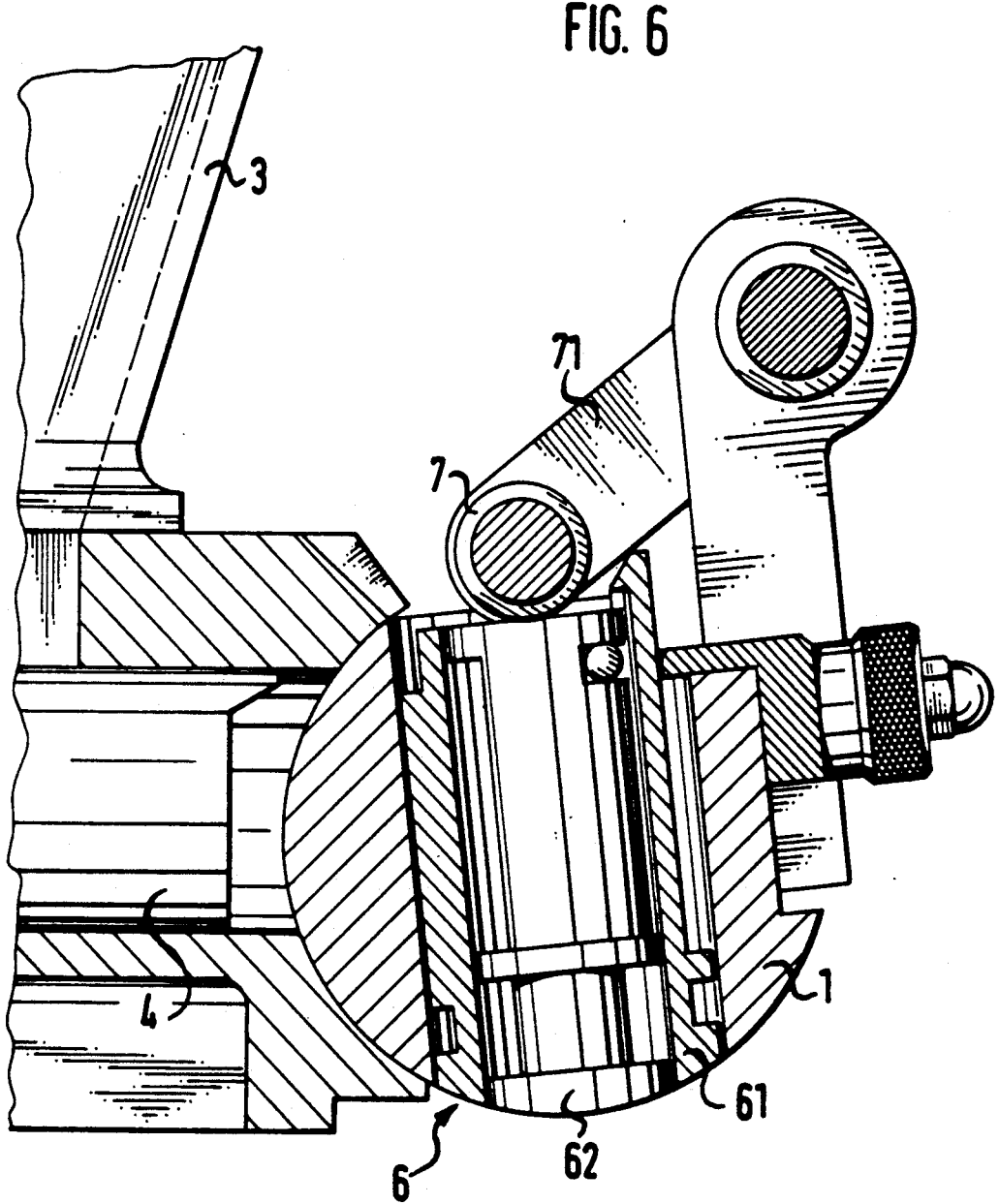
FIG. 6 shows the carrier in FIG. 1 rotated downwards by an angle of 90° in a discharge position.

The ejector rod 71 is operated to cause the piston means 6 to be displaced in a discharge stroke in the dividing chambers until the front face of the piston means 6 is flush with the front surface of the carrier in the manner illustrated in FIG. 6. Consequently, the quantity of dough in the dividing chambers will be discharged from the carrier 1 onto a support (not shown). The carrier 1 is then rotated back to its initial position and rollers 7 are retracted to their initial position when ejector rod 71 swings back to its initial position by means of levers 72.

The rollers 7 on ejector rod 71 serve as stops for limiting rearward displacement of the piston means 6 upon contact with internal pistons 62. The piston means is displaced to its rearward position by the pressure of the dough mass produced by delivery piston 4. During this displacement any dough in the dividing chamber is stripped therefrom by the moving piston means. By an adjustment of the pivotal travel of levers 72, the stroke of piston means 6 may be changed, so that an adjustment can be made of the dough volume to be received in the dividing chambers and hence of the dough volume discharged from the carrier 1. Details of the adjustment of the pivotal motion and of the drive of ejection rod 71 are not described nor shown in the drawing, as these are known in the art and are not germane to the invention.

The operational states for delivery of different size pieces of dough by the piston means is determined by selectively coupling the pistons 61 and 62 for common displacement to deliver larger pieces of dough or by locking piston 61 to the carrier 1 and thereby blocking its travel in a discharge stroke while permitting piston 62 to travel within piston 61 and thereby deliver smaller pieces of dough when the piston 62 is driven in its discharge stroke.

Figure 3:
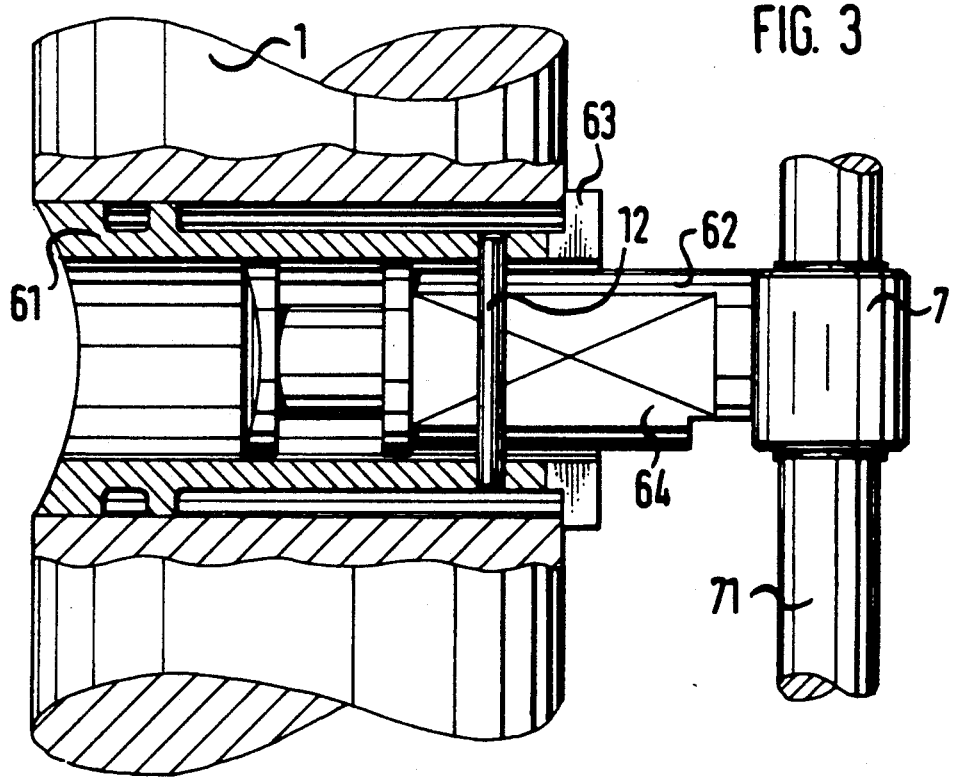
FIG. 3 is a top view of the carrier showing a partially retracted internal piston within a dividing chamber.

As can be seen in FIGS. 2 and 3, the small internal pistons 62 are each provided on its periphery with a flat region 64 extending parallel to the axis of the piston and over a length corresponding to the maximum stroke of the piston 62. A bolt 12 is supported by piston 61 and extends transversely of the pistons to ride on flat region 64 and thereby prevent rotation of piston 62 in piston 61 during the stroke of the piston 62 inside dividing chamber 51. A groove 22 is cut into the back end of piston 62 and is joined to flat region 64. In this way, it is possible to relatively rotate piston 62 and piston 61 (when the front ends of the pistons are flush with one another) by 180°, so that bolt 12 engages in groove 22 to lock piston 61 with piston 62 for common axial travel. This is the first operational state of the piston means and when piston 62 is driven by rollers 7 in a discharge stroke, pistons 61 and 62 will act together and larger dough pieces will be received and discharged from dividing chamber 5. If the pistons 61 and 62 are relatively rotated by 180° back to their initial positions representing the second operational state of piston means 6, the piston 62 is free to displace within the piston 61 to discharge smaller dough pieces.

Thus, it is possible in a simple way within a single row of dividing chambers to selectively realize different operating conditions. The operating condition for the division of small dough pieces is shown in FIG. 1. Here, smaller dividing chamber 51 is filled with dough by dough delivery piston 4. The discharge of the dough from small dividing chamber 51 is effected, after rotating the carrier 1 through an angle of 90° downward, by the smaller piston 62. FIG. 2 shows the large dividing chamber 5 with the measurement piston 61 retracted (pistons 61 and 62 are locked together by bolt 12 engaged in groove 22) for the discharge of larger dough pieces. The individual dividing chambers 5 may be placed out of operation so that no dough pieces are received and discharged therefrom by proceeding from the locked position of piston 61 shown in FIG. 1 and rotating piston 62 around its axis by 180°, so that groove 22 engages with the bolt 12 of piston 61. This piston is not shown in the drawing.

In FIG. 1, the piston 61 is locked in dividing chamber carrier 1 by the angular step 11. In this position, a leg 11' at the top of angular stop 11 engages edge 9 of piston 61. At the front side (adjacent to outlet 2), piston 61 is flush with the contour of dividing chamber carrier 1.

The small piston 62 is then free to move within dividing chamber 51. In FIG. 1, piston 62 is in its rearward stroke position under the pressure of the dough and the rearward stroke of piston 62 is limited by roller 7 on ejection rod 71. Thus, small dough pieces can be discharged from dividing chamber 51 during the forward stroke of piston 62.

In order to bring the piston means 6 to the operational state in FIG. 2 from that in FIG. 1, angular stop 11 is loosened by turning knurled nut 13 on bolt 14 and piston 61 is then rotated around its axis through an angle of 180° position shown in FIG. 2. In this position bolt 12 engages in groove 22 of piston 62, so that now the pistons 61 and 62 of piston means 6 are locked together for conjoint movement in dividing chamber 5. The piston 61 is free to move past angular stop 11 due to the position of a flat region 8 on piston 61 in facing relation to the stop 11. The end positions of stroke of piston 61 are now limited, on the one hand at the rear by roller 7 and on the other hand at the front by a shoulder 63 on piston 61. In this state large dough masses can be divided in dividing chamber 5. Dough groove 10 in piston 61 and 21 in piston 62 are provided.

If desired, the piston means 6 in one or more dividing chambers 5 within the row, may be placed out of operation a desired by simply locking piston 61 as shown in FIG. 1 and rotating the internal piston 62 by 180°, so that bolt 12 engages in groove 22 (this position is not shown in the drawing).

Figure 4:
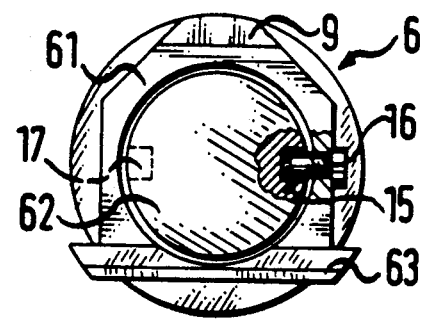
FIG. 4 is an end view, partly broken away and in section of another embodiment of the piston means.

Another embodiment for providing the three operational states for pistons 61 and 62 is shown in FIG. 4. The piston 61 is provided with a retractable shoulder bolt 16 having a shank which can engage in a longitudinal groove 15 in the piston 62, the length of groove 15 corresponding to the maximum stroke of piston 62. In this position, piston 62 is axially displaceable relative to piston 61 while being guided by bolt 16 in groove 15 and prevented from undergoing rotation relative thereto. By rotating piston 61 or piston 62 by 180°, the shank of the shoulder bolt can be engaged in a blind bore 17 in piston 62, so that piston 61 is locked with piston 62 so that both pistons move together in the operational state in which larger dough pieces are discharged from the carrier 1. In this condition, if piston 61 is locked in the carrier 1, no dough will be divided thus providing the third operational state.

If it is not necessary to deactivate the dividing chamber so that no dough is received and discharged from the carrier, blind bore 17 in piston 62 can be omitted and only two operational states will be provided, namely dividing chamber 5 for large dough volumes or chamber 51 for small dough volumes by rotating piston 61 by 180°. In the position shown in FIG. 4, piston 61 is unlocked in dividing chamber 5 and is free to travel therein, while piston 62 is free to travel axially in piston 61. In this condition pistons 61 and 62 ar both retracted under the pressure of the dough coming from the dough supply unit so that a relatively large dough mass is received in dividing chamber 5. When piston 62 is driven by roller 7, bolt 16 is at the forward end of groove 15 in piston 61 s that both pistons travel together in dividing chamber 5 to discharge the larger dough pieces from the carrier 1. When piston 61 is blocked in the carrier 1, the piston 62 will operate to receive dough mass in chamber 51 and deliver smaller dough pieces during its forward stroke.

Figure 5A:
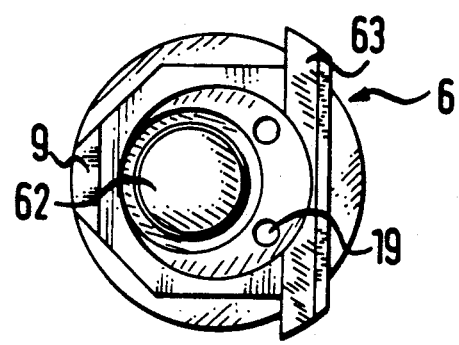
FIG. 5a is an end view of the embodiment in FIG. 5.
Figure 5:
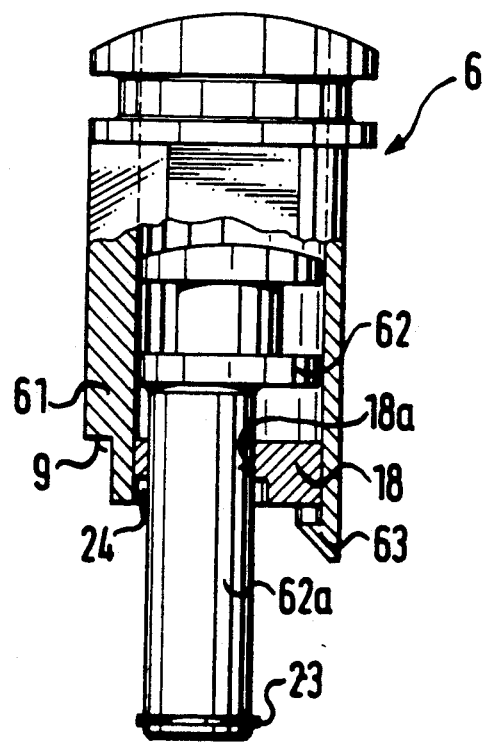
FIG. 5 shows, partially broken away and in section, another embodiment of the piston means.

These two operational states can also be achieved by the arrangement shown in the embodiment in FIGS. 5 and 5a wherein an eccentric shaft 62a is provided on measurement piston 62. Shaft 62a is axially displaceable in a hole 18a in a transverse rear wall 18 of piston 61, but because of the eccentricity of shaft 62a, the piston 62 is fixed in rotation in piston 61. Two ventilation holes 19 are provided in wall 18. At the end of shaft 62a, a spring washer 23 is mounted in a groove in the shaft. The washer 23 is received in a recess 24 in the wall 18 when the piston 62 is displaced forwardly in piston 61 so that their forward ends are aligned. If piston 61 is locked in carrier 1, only the piston 62 is operated and small dough pieces are received and discharged from carrier 1. I order to establish the other operational state in which large dough pieces are received and discharged from the carrier 1, piston 61 is rotated by 180° to be unlocked from the carrier 1. In this state, internal piston 62, as well as piston 61, are pushed back by the pressure of the dough discharged from the dough supply unit and in the discharge stroke, the small internal piston 62 is driven by roller 7 to engage the piston 61 via spring washer 23 and cause larger dough pieces to be discharged from dividing chamber 5.

The dividing chambers 5 which are arranged in great number next to each other in a row can be seen in the carrier 1 in FIG. 7 (where only three chambers are shown). Carrier 1 is rotatable in a machine housing (not shown), by means of bearing journals 1a. As further evident from FIG. 7, in the dividing chamber 5 at the right, analogous to FIG. 2, the piston means 6 is in its operational state to discharge larger dough pieces from dividing chamber 5 (the piston 61 is locked with piston 62 and is freely movable over leg 11' of angular stop 11 because leg 11' is engaged in downwardly facing flat region 8). In the second dividing chamber from the right, piston 61 engages the angular stop 11 (as in FIG. 1) so that the small piston 62 is movable in the dividing chamber 51 of piston 61. At the left in FIG. 7, the dividing chamber 5 is shown without piston means 6. It is also clear from FIG. 7 that the dividing chambers can be placed in different operating states in any sequence in the row.

Although the invention has been disclosed with reference to preferred embodiments thereof, it will become evident to those skilled in the art that numerous modifications and variations can be made within the scope and spirit of the invention as defined in the attached claims.

What is claimed is:

1. A machine for dividing dough comprising dough supply means having an outlet end for delivering dough under pressure from said outlet end, a displaceable carrier adjacent to said outlet end for receiving said dough from said dough supply means, said carrier having a dividing chamber with an open end for receiving said dough when the carrier is in a first receiving position, piston means in said dividing chamber for discharging the dough from said dividing chamber when the carrier has been displaced to a discharge position, said piston means having first and second operational states in which, for a given stroke of said piston means, said piston means delivers respective larger and smaller volumes of dough mass, and means for changing the piston means between said first and second operational states, said piston means comprising an external piston slidable in said dividing chamber and an internal piston slidable in said external piston, said external and internal pistons being coupled for conjoint movement in said first operational state, said internal piston being slidable in said external piston in said second operational state, said external and internal pistons being relatively rotatable, said means for changing the piston means between said first and second operational states comprising locking means for selectively locking the external and internal pistons for conjoint movement by relatively rotating said pistons, said locking means comprising a flat region extending axially along said internal piston at the periphery thereof, said internal piston having a groove in said periphery, a locking bolt carried by said external piston, said locking bolt being engaged in said groove in the internal piston when the pistons are locked together in the first operational state whereas in the unlocked position of the pistons, in the second operational state, said pistons are rotated relative to one another so that the locking bolt rides on said flat region on the internal piston.

2. A machine as claimed in claim 1 further comprising means for locking said piston means in said dividing chamber in one of said operational states to provide a third operational state for said piston means in which no dough mass is delivered by said piston means.

3. A machine as claimed in claim 1 comprising drive means for driving said piston means to discharge dough mass from the carrier, said drive means being positioned to drive said internal piston in a discharge stroke when said piston means is in either of said operational states.

4. A machine as claimed in claim 1 further comprising means for locking the external piston in said dividing chamber in the second operational state.

5. A machine as claimed in claim 4 comprising drive means for driving said piston means to discharge dough mass from said carrier, said drive means being positioned to drive said internal piston in a discharge stroke.

6. A machine for dividing dough comprising dough supply means having an outlet end for delivering a mass of dough under pressure, a rotatable carrier adjacent to said outlet end for receiving dough from the dough supply means, said rotatable carrier having a dividing chamber with an open end into which the dough from the dough supply means is introduced when the carrier is in a first receiving position, piston means in said dividing chamber for discharging the dough from said dividing chamber when the carrier has been rotated to a discharge position, said piston means comprising external and internal pistons selectively operable in said dividing chamber to discharge relatively larger and smaller pieces of dough from said carrier, and means for selectively coupling said pistons for conjoint operation to discharge larger pieces of dough or for separate operation of the internal piston within the external piston to discharge smaller pieces of dough, said external piston being slidable in said dividing chamber and said internal piston being slidable in said external piston, said external and internal pistons being coupled for conjoint movement in a first operational state, said internal piston being slidable in said external piston in a second operational state, said external and internal pistons being relatively rotatable, means for changing the piston means between said first and second operational states comprising locking means for selectively locking the external and internal pistons for conjoint movement by relatively rotating said pistons, said locking means comprising a flat region extending axially along said internal piston at the periphery thereof, said internal piston having a groove in said periphery, a locking bolt carried by said external piston, said locking bolt being engaged in said groove in the internal piston when the pistons are locked together in the first operational state whereas in the unlocked position of the pistons, in the second operational state, said pistons are rotated relative to one another so that the locking bolt rides on said flat region on the internal piston.

7. A machine as claimed in claim 6 wherein a plurality of said dividing chambers are arranged in a row in said carrier, each dividing chamber including a respective said piston means.

8. A machine as claimed in claim 7 wherein said means for selectively coupling the pistons in their respective said dividing chambers comprises first releasable means for selectively locking the external piston in the dividing chamber.

9. A machine as claimed in claim 8 wherein said first releasable means includes a fourth locking means for locking and unlocking the external piston in the dividing chamber by rotating said external piston in the dividing chamber.

10. A machine as claimed in claim 9 wherein in a configuration for discharge of larger pieces of dough from the carrier, said external piston is unlocked for displacement in said dividing chamber.

11. A machine as claimed in claim 9 wherein in a configuration for discharge of smaller pieces of dough, said external piston is locked by its respective further locking means to said carrier to be fixed in said dividing chamber and said internal piston is displaceable in said external piston.

12. A machine as claimed in claim 6 comprising roller means adjacent to said carrier remote from said open end of the dividing chamber, said roller means facing said internal piston for displacing said piston means to discharge the dough from said dividing chamber.

13. A machine as claimed in claim 6 wherein said further locking means comprises a locking member on said carrier engaging said external piston to prevent displacement thereof in a direction which would discharge the dough from the dividing chamber, said external piston having a flat region in the periphery thereof, said external piston being rotatable in said carrier to a position in which said locking member freely travels in said flat region whereby the external piston is displaced in the carrier.

14. A carrier for a dough dividing machine comprising a displaceable body having a dividing chamber with an inlet end into which dough can be introduced under pressure when the displaceable body is in a first receiving position and piston means slidable in said dividing chamber for discharging dough therefrom when the displaceable body is in a second discharge position, said piston means having first and second operational states in which, for a given stroke of said piston means, said piston means delivers respective larger and smaller volumes of dough mass, and means for changing the piston means between said first and second operational states, said piston means comprising an external piston slidable in said dividing chamber and an internal piston slidable in said external piston, said external and internal pistons being coupled for conjoint movement in said first operational state, said internal piston being slidable in said external piston in said second operational state, said external and internal pistons being relatively rotatable, said means for changing the piston means between said first and second operational states comprising locking means for selectively locking the external and internal pistons for conjoint movement by relatively rotating said pistons, said locking means comprising a flat region extending axially along said internal piston at the periphery thereof, said internal piston having a groove in said periphery, a locking bolt carried by said external piston, said locking bolt being engaged in said groove in the internal piston when the pistons are locked together in the first operational state whereas in the unlocked position of the pistons, in the second operational state, said pistons are rotated relative to one another so that the locking bolt rides on said flat region on the internal piston.

15. A carrier as claimed in claim 14 further comprising means for locking said piston means in said dividing chamber in one of said operational states to provide a third operational state for said piston means in which no dough mass is delivered by said piton means.

* * * * *